United States Patent

[11] 3,625,868

[72] Inventor Josef Grabmaier
Unterhaching, Germany
[21] Appl. No. 833,342
[22] Filed June 16, 1969
[45] Patented Dec. 7, 1971
[73] Assignee Siemens Aktiengesellschaft
Berlin, Germany
[32] Priority June 20, 1968
[33] Germany
[31] P 17 69 635.4

[54] THIN SEMICONDUCTOR GROWTH LAYER ON ALUMINA DEFICIENT, CRUCIBLE-PULLED MAGNESIUM ALUMINUM SPINEL MONOCRYSTAL AS WELL AS THE METHOD FOR PRODUCING THE LAYER AND PRODUCING THE MONOCRYSTALS
11 Claims, 2 Drawing Figs.

[52] U.S. Cl. .......... 252/521,
23/295, 23/301 SP
[51] Int. Cl. .......... H01b 1/06
[50] Field of Search .......... 252/521; 23/301 SP, 295

[56] References Cited

OTHER REFERENCES

Grabmaier et al., " Czochralski Growth of Magnesium-Aluminum Spinel," Journal of the American Ceramic Society, Vol. 51, No. 6, pp. 355- 356, June 21, 1968.

*Primary Examiner*—John T. Goolkasian
*Assistant Examiner*—Joseph C. Gil
*Attorneys*—Curt M. Avery, Arthur E. Wilfond, Herbert L. Lerner and Daniel J. Tick

ABSTRACT: Described are magnesium aluminum spinel monocrystals with a ratio of magnesia to alumina between 1:2.5 and 1:1. The crystals are pulled from a crucible. The surface of the crystals is used as a substrate for growing a semiconductor layer.

Figure 1:
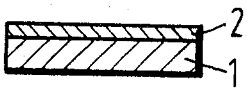

THIN SEMICONDUCTOR GROWTH LAYER ON ALUMINA DEFICIENT, CRUCIBLE-PULLED MAGNESIUM ALUMINUM SPINEL MONOCRYSTAL AS WELL AS THE METHOD FOR PRODUCING THE LAYER AND PRODUCING THE MONOCRYSTALS

The invention relates to a semiconductor layer grown on a highly insulated magnesium aluminum spinel crystal, used as a substrate, and to the production of said layer and of the monocrystals of magnesium-aluminum oxide needed as a substrate for this layer.

It is known how to produce semiconductor growth layers on magnesium aluminum spinel monocrystals, which are manufactured according to the Verneuil method and which have a molar composition of magnesium oxide to aluminum oxide of about 1:3.5. The bodies which are suitable as a substrate are preferably wafers fabricated from a monocrystal, produced as indicated above. Experience has shown, however, that the monocrystals, and therefore the bodies serving as a substrate, have an adverse characteristic. This characteristic is called "-polygonization" and is characterized by the fact that individual regions of a crystal plane are tilted upwardly several arc degrees with respect to one another and toward the customarily used (001) growth plane. Thus, for example, because of the polygonization, the epitactic coating of such substrate wafers results in areas with great surface roughness in the applied semiconductor layers. This roughness increases proportional to the deviation of the orientation of the actual growth layer of the substrate, e.g., from the (001) surface.

The roughness of the surface of the substrate in many ways also makes masking more difficult. The effect is particularly serious in very thin growth layers, e.g., in a range of a few $\mu$m, where a surface correction with the aid of subsequent mechanical processing is no longer feasible due, among other things, to the geometrical nature of the substrate wafer, for example, the rounded-off edges and a slight arching of the surface.

Coating tests which were conducted with spinel monocrystal wafers, produced in accordance with the Verneuil method, as a substrate showed that the degree of polygonization, also called "tilting," and thereby also the surface roughness of the grown layers, decreases when the amount of alumina increases.

By using the Verneuil method it is quite possible to produce mechanically stable spinel monocrystals with a mixing ratio of 1:3 and above, considered alumina rich. Mechanically stable is understood to mean that the monocrystal bodies can be mechanically treated without breaking or splitting, more particularly they can be sawed, ground and polished.

Attempts to further improve the semiconductor growth layers, produced according to the aforegoing statements, however, up to now remained unsuccessful. Thus, for example, an additional increase in the alumina content led to a precipitation of alumina in the interior of the crystals. These precipitations increase considerably, especially during prolonged heat treatments that cannot be obviated during epitactic precipitation.

It is an object of my invention to find a new way in which to produce better, that is, undisturbed and purer semiconductor growth layers, on a monocrystalline magnesium aluminum spinel substrate.

This problem is solved in accordance with the present invention by pulling the monocrystal from a crucible and by the fact that an alumina poor molar combination of magnesium oxide to aluminum oxide, in a ratio of 1:2.5.

The invented solution is particularly suitable for semiconductor epitactic precipitation and preferably for precipitating silicon. But other, appropriate semiconductor materials can also be precipitated on the monocrystal according to the invention.

This new method for improving semiconductor growth layers was not obvious mostly because, firstly, crucible-pulled, i.e., according to Czochralski, alumina rich spinels show, directly following their growth process, considerably larger amounts of precipitation than spinels produced according to the Verneuil method. Secondly, it could never be expected that the magnesium aluminum spinel crystals, which were pulled from the crucible according to the invention, and which have only a small alumina content, more particularly down to a stoichiometric ratio of 1:1, could be produced at all moreover have a much lower degree of polygonization, compared to crystals of a similar combination, grown according to the Verneuil method. It was surprising to discover, moreover, that the crystals produced by crucible-pulling in accordance with the invention were much more stable mechanically than comparable Verneuil crystals.

A particularly decisive advantage of using the substrate bodies in accordance with the present invention, i.e., the substrate bodies which were produced as described above, from crucible-pulled, alumina poor magnesium aluminum spinels, lies in the fact that, due to the feasible low content of alumina and the high-crystal perfection, no disturbing precipitation of aluminum oxide can be detected in the spinel, despite long heat processing, particularly during epitactic precipitations and during the subsequent diffusion processes.

The growth layers produced in accordance with the present invention do not normally require an after treatment, due to the slight surface roughness of the substrate, so that all advantages associated with a naturally grown, perfect layer are ensured, as compared to a layer which is subsequently, mechanically processed.

Figure 2:
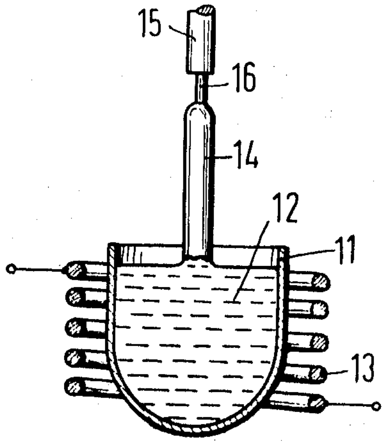

Other details of the invention are described with respect to the drawing in which FIG. 1 shows a substrate wafer with an epitactic layer thereon according to the invention; and FIG. 2 shows crystal-pulling apparatus for producing the rod.

In FIG. 1 a substrate wafer 1, which has been fabricated from an alumina poor magnesium aluminum spinel monocrystal, produced by crucible pulling, in accordance with the present invention is seen. The surface of the substrate wafer contains a silicon layer denoted as 2, grown according to a monocrystalline process. Devices of this type are primarily used as a first step in the production of integrated circuits and are thereafter processed accordingly.

FIG. 2 shows a device used for executing the crucible pulling according to the invention of an alumina poor, magnesium aluminum spinel monocrystal. A crucible 11, preferable comprised or iridium contains the melt of an original material to be grown into a monocrystal. The melt, which preferably comprises molten pieces of spinel crystals that were previously grown according to the Verneuil method is maintained in a molten state by the energy of a high frequency coil 13 which surrounds the crucible. The spinel monocrystal 14 is pulled from the melt along with seed crystal 16 with the aid of a pulling known device 15 which is not illustrated in detail. A spinel, preferably grown according to Verneuil technique, is used as the crystal seed 16. The crystal seed 16 and the crystal 14 which is to be pulled, are preferably rotated at about 30 r.p.m. considered a favorable value. The pulling velocity preferably is from 0.5 to 1 cm. per hour. Purified argon was used as a protective gas atmosphere. Helium or nitrogen could equally be used as the gas atmosphere.

The preferred pulling direction was in the aforementioned growth direction, namely (001) which was mentioned as being particularly suitable.

I claim:

1. Magnesium aluminum spinel monocrystal produced by pulling from the crucible, with a ratio of magnesium oxide to aluminum oxide between 1:2.5 and 1:1, whose surface is used as a substrate for growing a semiconductor layer.

2. The magnesium aluminum spinel monocrystal of claim 1, wherein the magnesium oxide to aluminum oxide ratio is between 1:1.8 and 1:1.

3. The magnesium aluminum spinel monocrystal of claim 1, wherein the magnesium oxide to aluminum oxide ratio is 1:1.

4. The magnesium aluminum spinel monocrystal of claim 1, wherein a (001) surface is suitable for use as a substrate for growing a semiconductor layer.

5. Magnesium aluminum spinel monocrystal, with a ratio of magnesium oxide to aluminum oxide between 1:2.5 and 1:1, which has a semiconductor layer epitactically precipitated upon a surface.

6. A magnesium aluminum spinel monocrystal, with a ratio of magnesium oxide to aluminum oxide between 1:2.5 and 1:1, which has silicon semiconductor layer precipitated thereon.

7. The method of producing a magnesium aluminum spinel monocrystal with a ratio of molecular combination magnesium oxide to aluminum oxide between 1:2.5 and 1:1 which comprises pulling crystal from a magnesium aluminum oxide melt, contained in an iridium crucible.

8. The method of claim 7, wherein the ratio is between 1:1.8 and 1:1.

9. The method of claim 7, wherein the ratio is 1:1.

10. The method of claim 7 whereby a seed crystal is used, which is grown according to the Verneuil technique and whose molecular combination of magnesium oxide to aluminum oxide, deviates with respect to its ratio from the monocrystal to be pulled.

11. The method of claim 10, wherein a seed crystal is used whose ratio of molecular combination of magnesium oxide to aluminum oxide is greater than the monocrystal being pulled.

* * * * *